US012774375B2

(12) United States Patent
Delevati et al.

(10) Patent No.: US 12,774,375 B2
(45) Date of Patent: Oct. 27, 2026

(54) ULTRASOFT EVA FOAM FORMULATION AND METHODS THEREOF

(71) Applicant: Braskem S.A., Camaçari (BR)

(72) Inventors: Giancarlos Delevati, São Paulo (BR); Robison Passos, São Paulo (BR)

(73) Assignee: Braskem S.A., Camacari (BR)

(*) Notice: Subject to any disclaimer, the term of this patent is extended or adjusted under 35 U.S.C. 154(b) by 0 days.

(21) Appl. No.: 17/492,385

(22) Filed: Oct. 1, 2021

(65) Prior Publication Data

US 2022/0106454 A1 Apr. 7, 2022

Related U.S. Application Data

(60) Provisional application No. 63/087,036, filed on Oct. 2, 2020, provisional application No. 63/087,027, filed on Oct. 2, 2020.

(51) Int. Cl.

| | |
|---|---|
| ***C08J 9/00*** | (2006.01) |
| ***C08J 9/06*** | (2006.01) |
| ***C08K 5/00*** | (2006.01) |
| ***C08K 5/14*** | (2006.01) |
| ***C08L 7/00*** | (2006.01) |
| ***C08L 23/0853*** | (2025.01) |

(52) U.S. Cl.

CPC ............ *C08J 9/0061* (2013.01); *C08J 9/065* (2013.01); *C08K 5/0025* (2013.01); *C08K 5/14* (2013.01); *C08L 7/00* (2013.01); *C08L 23/0853* (2013.01); *C08J 2201/026* (2013.01); *C08J 2201/03* (2013.01); *C08J 2203/02* (2013.01); *C08J 2203/04* (2013.01); *C08J 2205/052* (2013.01); *C08J 2205/06* (2013.01); *C08J 2323/08* (2013.01); *C08J 2331/04* (2013.01); *C08J 2407/00* (2013.01); *C08L 2205/025* (2013.01); *C08L 2205/03* (2013.01); *C08L 2207/04* (2013.01)

(58) Field of Classification Search

CPC .... C08J 9/0061; C08J 9/065; C08J 2201/026; C08J 2201/03; C08J 2203/02; C08J 2203/04; C08J 2205/052; C08J 2205/06; C08J 2323/08; C08J 2331/04; C08J 2407/00; C08J 9/0023; C08J 9/04; C08J 2423/08; C08K 5/0025; C08K 5/14; C08L 7/00; C08L 23/0853; C08L 2205/025; C08L 2205/03; C08L 2207/04

See application file for complete search history.

(56) References Cited

U.S. PATENT DOCUMENTS

| | | | | |
|---|---|---|---|---|
| 4,396,789 | A | 8/1983 | Barrocas et al. | |
| 5,840,971 | A | 11/1998 | Gubelmann-Bonneau | |
| 6,221,928 | B1 * | 4/2001 | Kozma | C08L 23/06 521/134 |
| 6,797,737 | B1 * | 9/2004 | Hsu | C08L 23/0853 36/43 |
| 9,181,143 | B2 | 11/2015 | do Carmo et al. | |
| 11,780,979 | B2 * | 10/2023 | Delevati | C08L 23/0853 521/95 |
| 2006/0235097 | A1 * | 10/2006 | Mahoney | C08J 9/102 521/61 |
| 2014/0066530 | A1 | 3/2014 | Shen et al. | |
| 2018/0355138 | A1 | 12/2018 | Wolschleger et al. | |
| 2019/0136006 | A1 * | 5/2019 | Rodrigues Camilo | C08J 9/228 |
| 2019/0315948 | A1 | 10/2019 | Delevati et al. | |
| 2019/0315949 | A1 | 10/2019 | Delevati et al. | |
| 2020/0407539 | A1 | 12/2020 | Delevati | |
| 2021/0070956 | A1 | 3/2021 | Delevati | |

FOREIGN PATENT DOCUMENTS

| | | | |
|---|---|---|---|
| BR | 102012025160 | A2 | 11/2013 |
| JP | S61146510 | A | 7/1986 |
| JP | S6232129 | A | 2/1987 |
| JP | S63151445 | A | 6/1988 |
| JP | 2019501254 | A | 1/2019 |
| JP | 2021518872 | A | 8/2021 |
| JP | 2021518873 | A | 8/2021 |
| WO | 201694161 | A1 | 6/2016 |
| WO | 2017102996 | A1 | 6/2017 |
| WO | 2018-112593 | A1 | 6/2018 |
| WO | 2019202405 | A1 | 10/2019 |
| WO | 2019202406 | A1 | 10/2019 |
| WO | 2021048634 | A1 | 3/2021 |

OTHER PUBLICATIONS

Brsakem I"m Greem (Year: 2018).*
WorldWide Foam, Shore A V.S. Shore 00 V.S Asker C (Year: 2010).*
Braskem Ethylene-Vinyl Acetate Copolymer SVT2145R Data Sheet (Year: 2020).*
Braskem EVA : SVT2145R Safety Data Sheet (Year: 2021).*
International Search Report issued in corresponding International Application No. PCT/IB2021/022221; mailed Dec. 21, 2021 (6 pages).
Written Opinion of the International Searching Authority issued in corresponding International Application No. PCT/IB2021/022221; dated Dec. 21, 2021 (9 pages).
K. Li et al., "Selective Catalytic Oxidation of Ethanol to Acetic Acid on Dispersed Mo-V-Nb Mixed Oxides", Chem. Eur. J., 2007, vol. 13, pp. 9324-9330 (7 pages).
B. Jones et al., "The Production of Vinyl Acetate Monomer as a Co-Product from the Non-Catalytic Cracking of Soybean Oil", Processes, 2015, vol. 3, pp. 619-633 (15 pages).

(Continued)

*Primary Examiner* — Margaret G Moore
(74) *Attorney, Agent, or Firm* — Osha Bergman Watanabe & Burton LLP

(57) ABSTRACT

A polymer composition may include at least one ethylene vinyl acetate (EVA) polymer; a blowing agent in an amount ranging from 2 to 18 phr; and a crosslinking agent in an amount ranging from 0.3 to 4 phr. A method includes expanding an EVA-based polymer composition to form a foam having a density ranging from 0.01 g/cm3 to 0.06 g/cm3 and a hardness ranging from 10 to 60 Shore 00.

15 Claims, No Drawings

(56) References Cited

OTHER PUBLICATIONS

N. Saichana et al., Abstract of "Acetic acid bacteria: A group of bacteria with versatile biotechnological applications" Biotechnology Advances, vol. 33, Issue 6, part 2, Nov. 1, 2015 (2 pages).
P. Raspor et al., "Biotechnological Applications of Acetic Acid Bacteria", Critical Reviews in Biotechnology, vol. 28, 2008, pp. 101-124 (26 pages).
Notice of Reasons for Refusal issued in corresponding Japanese Application No. 2023-520223, dated Jul. 22, 2025 (17 pages).
Office Action issued in the counterpart Japanese Application No. 2023-520223, mailed Mar. 10, 2026 (8 pages).

* cited by examiner

ULTRASOFT EVA FOAM FORMULATION AND METHODS THEREOF

BACKGROUND

Polyolefin copolymers such as ethylene vinyl acetate (EVA) may be used to manufacture a varied range of articles, including films, molded products, foams, and the like. In general, polyolefins are widely used plastics worldwide, given their versatility in a wide range of applications. EVA may have characteristics such as high processability, low production cost, flexibility, low density and recycling possibility. However, EVA compositions generally do not have a combination of density and hardness that enables their use in the production of articles that are required to have a very soft touch.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to polymer compositions that include at least one ethylene vinyl acetate (EVA) polymer; a blowing agent in an amount ranging from 2 to 18 phr; and a crosslinking agent in an amount ranging from 0.3 to 4 phr.

In another aspect, embodiments disclosed herein relate to expanded articles that are prepared from polymer compositions that include at least one ethylene vinyl acetate (EVA) polymer; a blowing agent in an amount ranging from 2 to 18 phr; and a crosslinking agent in an amount ranging from 0.3 to 4 phr.

In a further aspect, embodiments disclosed herein relate to methods that include: expanding an EVA-based polymer composition to form a foam having a density ranging from 0.01 g/cm$^3$ to 0.06 g/cm$^3$ and a hardness ranging from 10 to 60 Shore 00.

Other aspects and advantages of the claimed subject matter will be apparent from the following description and the appended claims.

DETAILED DESCRIPTION

In one aspect, embodiments disclosed herein are directed to a polymer composition containing EVA that when expanded, may having ultrasoft properties that are particularly suitable for garments such as bras and mattresses. EVA is a copolymer of the polyolefin family of elastomers that comprises units derived from ethylene and vinyl acetate. EVA copolymers are generally produced by the polymerization of ethylene and vinyl acetate at high temperature and pressure. EVA copolymers provide materials that can be processed like other thermoplastics but may exhibit unique properties.

The use of products derived from natural sources, as opposed to those obtained from fossil sources, has increasingly been widely preferred as an effective means of reducing the increase in atmospheric carbon dioxide concentration, therefore effectively limiting the expansion of the greenhouse effect. Products thus obtained from natural raw materials have a difference, relative to fossil sourced products, in their renewable carbon contents. This renewable carbon content can be certified by the methodology described in ASTM D 6866-18, "Standard Test Methods for Determining the Biobased Content of Solid, Liquid, and Gaseous Samples Using Radiocarbon Analysis". Products obtained from renewable natural raw materials have the additional property of being able to be incinerated at the end of their life cycle and only producing $CO_2$ of a non-fossil origin.

Generally, EVA-derived materials are not able to provide the requisite combination of properties, such as density and hardness, to be used for applications, such as mattresses and bras, that require exceptional softness. However, the polymer compositions, and articles therefrom, of some embodiments of the present disclosure possess superior properties to traditional materials and are able to be used in such applications.

Polymer Compositions

Polymer compositions in accordance with the present disclosure may include at least one ethylene vinyl acetate (EVA) polymer. In one or more embodiments, the ethylene vinyl acetate (EVA) polymer may exhibit a biobased carbon content as determined by ASTM D6866-18 Method B of at least 5%. In other embodiments, the ethylene vinyl acetate (EVA) polymer may be a petroleum-based EVA polymer.

Polymer compositions in accordance with the present disclosure may further include a first EVA polymer at an amount that ranges from a lower limit selected from one of 35 parts per hundred resin (phr), 40 phr, 45 phr, 50 phr, 55 phr, 60 phr, and 65 phr to an upper limit selected from one of 70 phr, 75, phr, 80 phr, 85 phr, 90 phr, and 95 phr where any lower limit can be used with any upper limit. Polymer compositions in accordance with the present disclosure may further include a second EVA polymer at an amount that ranges from a lower limit selected from one of 8 parts per hundred resin (phr), 10 phr, 12 phr, 15 phr, 18 phr, 20 phr, 22 phr, and 25 phr to an upper limit selected from one of 28 phr, 30 phr, 32, phr, 35 phr, 38 phr, 40 phr, 45 phr, and 50 phr where any lower limit can be used with any upper limit. Polymer compositions of particular embodiments in accordance with the present disclosure may comprise a first EVA polymer at an amount ranging from 40 to 90 phr and a second EVA polymer at an amount ranging from 10 to 40 phr.

In one or more embodiments, polymer compositions in accordance with the present disclosure may contain a first EVA polymer exhibiting a bio-based carbon content as determined by ASTM D6866-18 Method B of at least 5%, and a second EVA polymer that is a petroleum-based EVA polymer. In such embodiments, the first EVA polymer that is bio-based may be present in the ranges described in the preceding paragraph for the first EVA polymer, and the second EVA polymer that is petroleum-based may be present in the ranges described in the preceding paragraph for the second EVA polymer. In one or more embodiments, the first EVA polymer and the second EVA polymer may be petroleum-based polymers, i.e., obtained from fossil sources, as compared to natural resources. In one or more embodiments, the second EVA polymer may be an elastomeric EVA polymer.

In one or more embodiments, polymer compositions in accordance with the present disclosure may contain one or more blowing agents at a parts per hundred resin (phr) that ranges from a lower limit selected from one of 1 phr, 1.5 phr, 2 phr, 3 phr, 4 phr, 5 phr, 6 phr, 7 phr, 8 phr, 9 phr and 10 phr to an upper limit selected from one of 9 phr, 10 phr, 11 phr, 12, phr, 13 phr, 14 phr, 15 phr, 16 phr, 17 phr, 18 phr, and 20 phr, where any lower limit may be used with any upper limit. In some embodiments, the polymer compositions may contain the one or more blowing agents in a total amount ranging from 2 to 18 phr. In particular embodiments, the polymer compositions may contain the one or more blowing agents in a total amount ranging from 5 to 8 phr. Polymer compositions in accordance with some embodiments of the present disclosure may comprise the one or more blowing agents in an amount that is sufficient to achieve an expansion of 80% or more, 100% or more, 120% or more, 150% or more, 200% or more, 250% or more, or 300% or more.

In one or more embodiments, polymer compositions in accordance with the present disclosure may contain one or more crosslinking agents in an amount that ranges from a lower limit selected from one of 0.3 phr, 0.5 phr, 1 phr, 1.5 phr, and 2 phr, to an upper limit selected from one of 2 phr, 2.5 phr, 3 phr, 3.5 phr, and 4 phr, where any lower limit can be used with any upper limit. It may be envisioned that the concentration of the crosslinking agent may be more or less depending on the application of the final material.

In one or more embodiments, polymer compositions in accordance with the present disclosure may further contain one or more blowing accelerators at a parts per hundred resin (phr) that ranges from a lower limit selected from one of 0.01 phr, 0.1 phr, 0.25 phr, 0.5 phr, 1 phr, 2 phr, and 2.5 phr, to an upper limit selected from one of 1.5 phr, 2 phr, 2.5 phr, 3 phr, 3.5 phr, 4 phr, 4.5 phr and 5 phr, where any lower limit can be used with any upper limit.

Polymer compositions in accordance with the present disclosure may optionally include one or more natural rubbers in an amount that ranges from a lower limit selected from one of 1 phr, 5 phr, 7 phr, and 10 phr to an upper limit selected from one of 10 phr, 12 phr, 15 phr, 17 phr, and 20 phr, where any lower limit can be used with any upper limit. Polymer compositions of particular embodiments in accordance with the present disclosure may comprise a natural rubber in an amount ranging from 5 to 20 phr.

In one or more embodiments, polymer compositions in accordance with the present disclosure may optionally contain one or more crosslinking co-agent in an amount that ranges from a lower limit selected from one of 0.01 phr, 0.25 phr, 0.5 phr, 1 phr to an upper limit selected from one of 1.5 phr, 2 phr, and 3 phr, where any lower limit may be paired with any upper limit.

In one or more embodiments, polymer compositions in accordance with the present disclosure may optionally contain a percent by weight of the total composition (wt %) of one or more fillers that ranges from a lower limit selected from one of 0.02 wt %, 0.05 wt %, 1.0 wt %, 5.0 wt %, 10.0 wt %, 15.0 wt %, and 20.0 wt %, to an upper limit selected from one of 25.0 wt %, 30.0 wt %, 40.0 wt %, 50.0 wt %, 60.0 wt %, and 70.0 wt %, where any lower limit can be used with any upper limit.

In one or more embodiments, polymer compositions in accordance with the present disclosure may also contain one or more plasticizers in an amount ranging from 3 to 40 phr. In one or more embodiments, the plasticizer may have a lower limit of any of 3, 5, 7, 10, 12, and 15 phr, and an upper limit of any of 20, 22, 25, and 30, phr, where any lower limit may be used in combination with any upper limit.

EVA Polymers

The EVA polymers of the polymer compositions in accordance with one or more embodiments may be prepared, and have properties, as disclosed in U.S. patent application Ser. No. 16/385,767, which is incorporated herein in its entirety. In some embodiments, there may be at least two EVA polymers present, where some of the total EVA may be derived from fossil (petrochemical) sources and other of the total EVA may be derived from renewable sources.

The EVA polymers of one or more embodiments may have an ethylene content that ranges from a lower limit selected from one of 5 wt %, 25 wt %, 40 wt %, 60 wt %, 66 wt %, and 72 wt %, to an upper limit selected from one of 80 wt %, 85 wt %, 88 wt %, 92 wt %, and 95 wt %, relative to the weight of the EVA polymer, where any lower limit may be paired with any upper limit. Further, of this total amount of ethylene of one or more embodiments, it is understood that at least a portion of that ethylene may optionally be based on a renewable carbon source, as discussed below.

In one or more embodiments, polymer compositions in accordance with the present disclosure may include EVA polymers that have various ratios of ethylene and vinyl acetate, in addition to including one or more optional additional comonomers. Polymer compositions in accordance with the present disclosure may include an EVA polymer containing a percent by weight of vinyl acetate content, as determined by ASTM D5594, that ranges from a lower limit selected from one of 8 wt %, 12 wt %, 15 wt %, 18 wt %, 20 wt %, 24 wt %, or 28 wt %, to an upper limit selected from 30 wt %, 33 wt %, 35 wt %, 40 wt %, 60 wt %, 75 wt %, or 95 wt %, relative to the weight of the EVA polymer, where any lower limit may be paired with any upper limit. Further, of this total amount of vinyl acetate, it is understood that at least a portion of that vinyl acetate may optionally be based on a renewable carbon source, discussed below.

Polymer compositions in accordance with the present disclosure may include an EVA polymer, wherein the number average molecular weight (Mn) in kilodaltons (kDa) of the EVA polymer ranges from a lower limit selected from one of 5 kDa, 10 kDa, 20 kDa and 25 kDa to an upper limit selected from one of 30 kDa, 35 kDa, 40 kDa and 50 kDa, where any lower limit may be paired with any upper limit.

Polymer compositions in accordance with the present disclosure may include an EVA polymer, wherein the weight average molecular weight (Mw) in kilodaltons (kDa) of the EVA polymer ranges from a lower limit selected from one of 25 kDa, 50 kDa, 70 kDa, 90 kDa and 110 kDa to an upper limit selected from one of 120 kDa, 140 kDa, 150 kDa and 180 kDa, where any lower limit may be paired with any upper limit.

Polymer compositions in accordance with the present disclosure may include an EVA polymer, wherein the dispersity (Mw/Mn) of the EVA polymer ranges from a lower limit selected from one of 1.0, 1.5, 3.0 and 4.0 to an upper limit selected from one of 5.0, 6.0, 7.0 and 8.0, where any lower limit may be paired with any upper limit.

The molecular weight properties may be measured by GPC (Gel Permeation Chromatography) experiments. Such experiments may be coupled with triple detection, such as with an infrared detector IR5, a four-bridge capillary viscometer (PolymerChar) and an eight-angle light scattering detector (Wyatt). A set of 4 mixed bed, 13 μm columns (Tosoh) may be used at a temperature of 140° C. The experiments may use a concentration of 1 mg/mL, a flow rate of 1 mL/min, a dissolution temperature and time of 160° C. and 90 minutes, respectively, an injection volume of 200 μL, and a solvent of trichlorium benzene stabilized with 100 ppm of BHT.

Polymer compositions in accordance with the present disclosure may include an EVA polymer, where the EVA polymer exhibits a melt index as determined by ASTM D1238 that may range from a lower limit selected from one of 0.1, 1, 2, 3, 5, 10, 15 or 20 to an upper limit selected from one of 30, 35, 40, 43, 50, 100 or 200 g/10 min measured with a load of 2.16 kg at 190° C., where any lower limit may be paired with any upper limit.

As mentioned, it is also envisioned that the EVA copolymer of the present disclosure may also contain one or more additional comonomers, by reacting an EVA polymer resin, prepolymer, or EVA monomers with one or more additional comonomers, including but not limited to one or more polar monomers, such as those of the type described in PCT/BR2017/050398, which is herein incorporated by reference in its entirety.

In particular embodiments, the EVA polymers may be HM728, 3019PE, 8019PE, PN2021, HM150, SVT2180, and combinations thereof, which are commercially available from Braskem.

Elastomeric EVA Composition

As previously described, polymeric compositions in accordance with one or more embodiments of the present disclosure may include an elastomeric ethylene vinyl acetate (EVA) composition which may be prepared from of (A) an EVA copolymer, (B) ethylene alpha-olefin copolymer, (C) polyorganosiloxane, (D) plasticizer, and (E) rubber, that are crosslinked in some embodiments by a (F) crosslinking agent. Elastomeric EVA compositions are prepared as disclosed in the Brazilian patent BR102012025160-4, and U.S. Patent Application No. 62/594,307, both of which are incorporated herein in their entirety. The major components of the elastomer composition of the present disclosure as well as their respective properties are detailed below.

(A) EVA Copolymer

Elastomeric EVA compositions in accordance may incorporate one or more ethylene-vinyl acetate (EVA) copolymers prepared by the copolymerization of ethylene and vinyl acetate. In some embodiments, the EVA copolymer can be derived from fossil or renewable sources such as biobased EVA. Biobased EVA is an EVA wherein at least one of ethylene and/or vinyl acetate monomers are derived from renewable sources, such as ethylene derived from biobased ethanol.

Polymer compositions in accordance with the present disclosure may include an EVA copolymer, wherein the percent by weight of ethylene in the EVA polymer ranges from a lower limit selected from one of 60 wt %, 66 wt %, and 72 wt %, to an upper limit selected from one of 82 wt %, 88 wt %, 92 wt %, and 95 wt %, where any lower limit may be paired with any upper limit. Further, of this total amount of ethylene, it is understood that at least a portion of that ethylene is based on a renewable carbon source.

Polymer compositions in accordance with the present disclosure may include EVA copolymers incorporating various ratios of ethylene and vinyl acetate. Polymer compositions in accordance with the present disclosure may include an EVA copolymer, wherein the percent by weight of vinyl acetate in the copolymer, as determined by ASTM D5594, ranges from a lower limit selected from one of 5 wt %, 8 wt %, 12 wt %, and 18 wt % to an upper limit selected from 28 wt %, 33 wt %, and 40 wt %, where any lower limit may be paired with any upper limit. Further, of this total amount of vinyl acetate, it is understood that at least a portion of that vinyl acetate may be based on a renewable carbon source.

Polymer compositions in accordance with the present disclosure may include an EVA copolymer, wherein the number average molecular weight (Mn) in kilodaltons (kDa) of the EVA copolymer ranges from a lower limit selected from one of 5 kDa, 10 kDa, 20 kDa and 25 kDa to an upper limit selected from one of 30 kDa, 35 kDa, 40 kDa and 50 kDa, where any lower limit may be paired with any upper limit.

Polymer compositions in accordance with the present disclosure may include an EVA copolymer, wherein the weight average molecular weight (Mw) in kilodaltons (kDa) of the EVA copolymer ranges from a lower limit selected from one of 25 kDa, 50 kDa, 70 kDa, 90 kDa and 110 kDa to an upper limit selected from one of 120 kDa, 140 kDa, 150 kDa and 180 kDa, where any lower limit may be paired with any upper limit.

Polymer compositions in accordance with the present disclosure may include an EVA copolymer, wherein the dispersity (Mw/Mn) of the EVA copolymer ranges from a lower limit selected from one of 1.0, 1.5, 3.0 and 4.0 to an upper limit selected from one of 5.0, 6.0, 7.0 and 8.0, where any lower limit may be paired with any upper limit.

The molecular weight properties may be measured by GPC (Gel Permeation Chromatography) experiments. Such experiments may be coupled with triple detection, such as with an infrared detector IRS and a four-bridge capillary viscometer (PolymerChar) and an eight-angle light scattering detector (Wyatt). A set of 4 mixed bed, 13 μm columns (Tosoh) may be used at a temperature of 140° C. The experiments may use a concentration of 1 mg/mL, a flow rate of 1 mL/min, a dissolution temperature and time of 160° C. and 90 minutes, respectively, an injection volume of 200 μL, and a solvent of trichlorium benzene stabilized with 100 ppm of BHT.

Elastomeric EVA compositions in accordance with the present disclosure may contain an ethylene vinyl acetate copolymer at a percent by weight (wt %) of the composition that ranges from a lower limit of 20 wt %, 30 wt %, 40 wt %, or 50 wt %, to an upper limit of 60 wt %, 70 wt %, 80 wt %, or 90 wt %, where any lower limit may be paired with any upper limit.

(B) Ethylene Alpha-Olefin Copolymer

Elastomeric EVA compositions in accordance may incorporate one or more copolymers prepared from the polymerization of ethylene and a C3 to C20 alpha-olefin.

Ethylene alpha-olefin copolymer in accordance with the present disclosure may have a hardness determined in accordance with ASTM D2240 in a range having a lower limit selected from any of 10 Shore A, 15 Shore A, and 20 Shore A, to an upper limit selected from any of 70 Shore A, 75 Shore A, and 80 Shore A, where any lower limit may be paired with any upper limit.

Ethylene alpha-olefin copolymer in accordance with the present disclosure may have a density determined according to ASTM D792 in a range having a lower limit selected from any of 0.80 g/cm$^3$, 0.85 g/cm$^3$, and 0.88 g/cm$^3$, to an upper limit selected from any of 0.89 g/cm$^3$, 0.90 g/cm$^3$, and 0.95 g/cm$^3$, where any lower limit may be paired with any upper limit.

Ethylene alpha-olefin copolymer in accordance with the present disclosure may have a melt flow index (MFI) at 190° C. and 2.16 kg as determined according to ASTM D1238 in a range having a lower limit selected from any of 0.01 g/10 min, 0.05 g/10 min, and 0.1 g/10 min, 0.5 g/10 min, 1 g/10 min, 5 g/10 min and 10 g/10 min to an upper limit selected from any of 70 g/10 min, 75 g/10 min, and 100 g/10 min, where any lower limit may be paired with any upper limit.

Elastomeric EVA compositions in accordance with the present disclosure may contain an ethylene alpha-olefin copolymer at a percent by weight (wt %) of the composition that ranges from a lower limit of 5 wt % or 10 wt %, to an upper limit of 30 wt % or 60 wt %, where any lower limit may be paired with any upper limit.

(C) Polyorganosiloxane

Elastomeric EVA compositions in accordance with the present disclosure may incorporate a polyorganosiloxane. In one or more embodiments, suitable polyorganosiloxanes include a linear chain, branched, or three-dimensional structure, wherein the side groups can include one or more of methyl, ethyl, propyl groups, vinyl, phenyl, hydrogen, amino, epoxy, or halogen substituents. The terminal groups of the polyorganosiloxane may include hydroxyl groups, alkoxy groups, trimethylsilyl, dimethyldiphenylsilyl, and the like. Polyorganosiloxanes in accordance with the present disclosure may include one or more of dimethylpolysiloxane, methylpolysiloxane, and the like.

Elastomeric EVA compositions in accordance with the present disclosure may contain a polyorganosiloxane having a viscosity measured at 25° C. that ranges from a lower limit of 20 cP or 40 cP, to an upper limit of 700,000 cP or 900,000 cP, where any lower limit may be paired with any upper limit.

Elastomeric EVA compositions in accordance with the present disclosure may contain a polyorganosiloxane at a percent by weight (wt %) of the composition that ranges from a lower limit of 0.1 wt % or 0.5 wt %, to an upper limit of 5 wt % or 10 wt %, where any lower limit may be paired with any upper limit.

(D) Plasticizer

Elastomeric EVA compositions in accordance may incorporate a plasticizer to improve the processability and adjust the hardness of the elastomeric EVA. Plasticizers in accordance with the present disclosure may include one or more of bis(2-ethylhexyl) phthalate (DEHP), di-isononyl phthalate (DINP), bis (n-butyl) phthalate (DNBP), butyl benzyl phthalate (BZP), di-isodecyl phthalate (DIDP), di-n-octyl phthalate (DOP or DNOP), di-o-octyl phthalate (DIOP), diethyl phthalate (DEP), di-isobutyl phthalate (DIBP), di-n-hexyl phthalate, tri-methyl trimellitate (TMTM), tri-(2-ethylhexyl) trimellitate (TEHTM-MG), tri-(n-octyl, n-decyl) trimellitate, tri-(heptyl, nonyl) trimellitate, n-octyl trimellitate, bis (2-ethylhexyl) adipate (DEHA), dimethyl adipate (DMD), mono-methyl adipate (MMAD), dioctyl adipate (DOA)), dibutyl sebacate (DBS), polyesters of adipic acid such as VIERNOL, dibutyl maleate (DBM), di-isobutyl maleate (DIBM), benzoates, epoxidized soybean oils, n-ethyl toluene sulfonamide, n-(2-hydroxypropyl) benzene sulfonamide, n-(n-butyl) benzene sulfonamide, tricresyl phosphate (TCP), tributyl phosphate (TBP), glycols/polyesters, triethylene glycol dihexanoate, 3gh), tetraethylene glycol di-heptanoate, polybutene, acetylated monoglycerides; alkyl citrates, triethyl citrate (TEC), acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trihexyl o-butyryl citrate, trimethyl citrate, alkyl sulfonic acid phenyl ester, 2-cyclohexane dicarboxylic acid di-isononyl ester, nitroglycerin, butanetriol trinitrate, dinitrotoluene, trimethylolethane trinitrate, diethylene glycol dinitrate, triethylene glycol dinitrate, bis (2,2-dinitropropyl) formal, bis (2,2-dinitropropyl) acetal, 2,2,2-trinitroethyl 2-nitroxyethyl ether, mineral oils, among other plasticizers and polymeric plasticizers.

Elastomeric EVA compositions in accordance with the present disclosure may contain a plasticizer at a percent by weight (wt %) of the composition that ranges from a lower limit of 0.5 wt % or 2 wt %, to an upper limit of 10 wt % or 20 wt %, where any lower limit may be paired with any upper limit.

(E) Rubber

Elastomeric EVA compositions in accordance may incorporate a rubber component to increase the rubbery touch and increase the coefficient of friction, depending on the end application. Rubbers in accordance with the present disclosure may include one or more of natural rubber, polyisoprene (IR), styrene and butadiene rubber (SBR), polybutadiene, nitrile rubber (NBR); polyolefin rubbers such as ethylene-propylene rubbers (EPDM, EPM), and the like, acrylic rubbers, halogen rubbers such as halogenated butyl rubbers including brominated butyl rubber and chlorinated butyl rubber, brominated isotubylene, polychloroprene, and the like; silicone rubbers such as methylvinyl silicone rubber, dimethyl silicone rubber, and the like, sulfur-containing rubbers such as polysulfidic rubber; fluorinated rubbers; thermoplastic rubbers such as elastomers based on styrene, butadiene, isoprene, ethylene and propylene, styrene-isoprene-styrene (SIS), styrene-ethylene-butylene-styrene (SEBS), styrene-butylene-styrene (SBS), and the like, ester-based elastomers, elastomeric polyurethane, elastomeric polyamide, and the like.

Rubbers in accordance with the present disclosure may have a hardness determined in accordance with ASTM D2240 in a range having a lower limit selected from any of 10 Shore A, 15 Shore A, and 20 Shore A, to an upper limit selected from any of 45 Shore A, 50 Shore A, and 55 Shore A, where any lower limit may be paired with any upper limit.

Elastomeric EVA compositions in accordance with the present disclosure may contain a rubber at a percent by weight (wt %) of the composition that ranges from a lower limit of 0.5 wt % or 1 wt %, to an upper limit of 20 wt % or 40 wt %, where any lower limit may be paired with any upper limit.

In one or more embodiments, the elastomeric EVA composition may have a melt flow index (MFI) at 190° C. and 2.16 kg as determined according to ASTM D1238 in a range having a lower limit selected from any of 1 g/10 min, 2 g/10 min, 3 g/10 min, and 4 g/10 min, to an upper limit selected from any of 10 g/10 min, 15 g/10 min, 20 g/10 min, 25 g/10 min, and, where any lower limit may be paired with any upper limit, where any lower limit may be paired with any upper limit.

In one or more embodiments, the elastomeric EVA composition may have a density determined according to ASTM D792 in a range having a lower limit selected from any of 0.92 $g/cm^3$, 0.93 $g/cm^3$, and 0.94 $g/cm^3$, to an upper limit selected from any of 0.94 $g/cm^3$, 0.95 $g/cm^3$, and 0.96 $g/cm^3$, where any lower limit may be paired with any upper limit.

In one or more embodiments, the elastomeric EVA composition exhibits a Shore A hardness as determined by ASTM D2240 that may range from a lower limit of any of 40, 50, or 60 to an upper limit of 70, 80, or 90 Shore A, where any lower limit may be paired with any upper limit.

Bio-Based Carbon Content

In polymer compositions of one or more embodiments, one or more of the EVA polymer and the elastomeric EVA composition may contain at least a portion of bio-based carbon. In embodiments where both the EVA polymer and the elastomeric EVA composition contain bio-based carbon, their respective bio-based carbon contents may be the same as, or different from, each other.

Specifically, in one or more embodiments, one or more of the EVA polymer and the elastomeric EVA composition may exhibit a bio-based carbon content, as determined by ASTM D6866-18 Method B, of at least 5%. Some embodiments may include at least 10%, 20%, 40%, 50%, 60%, 80%, or 100% bio-based carbon. The total bio-based or renewable carbon in the EVA polymer and/or the elastomeric EVA composition may be contributed from a bio-based ethylene and/or a bio-based vinyl acetate.

For example, in one or more embodiments, the renewable source of carbon may be one or more plant materials selected from the group consisting of sugar cane and sugar beet, maple, date palm, sugar palm, sorghum, American agave, corn, wheat, barley, sorghum, rice, potato, cassava, sweet potato, algae, fruit, materials comprising cellulose, wine, materials comprising hemicelluloses, materials comprising lignin, wood, straw, sugarcane bagasse, sugarcane leaves, corn stover, wood residues, paper, and combinations thereof.

In one or more embodiments, bio-based ethylene may be obtained by fermenting a renewable source of carbon to produce ethanol, which may be subsequently dehydrated to produce ethylene. Further, it is also understood that the fermenting produces, in addition to the ethanol, byproducts of higher alcohols. If the higher alcohol byproducts are present during the dehydration, then higher alkene impurities may be formed alongside the ethanol. Thus, in one or more embodiments, the ethanol may be purified prior to dehydration to remove the higher alcohol byproducts while in other embodiments, the ethylene may be purified to remove the higher alkene impurities after dehydration.

Thus, biologically sourced ethanol, known as bio-ethanol, may be obtained by the fermentation of sugars derived from cultures such as that of sugar cane and beets, or from hydrolyzed starch, which is, in turn, associated with other cultures such as corn. It is also envisioned that the bio-based ethylene may be obtained from hydrolysis-based products of cellulose and hemi-cellulose, which can be found in many agricultural by-products, such as straw and sugar cane husks. This fermentation is carried out in the presence of varied microorganisms, the most important of such being the yeast Saccharomyces cerevisiae. The ethanol resulting therefrom may be converted into ethylene by means of a catalytic reaction at temperatures usually above 300° C. A large variety of catalysts can be used for this purpose, such as high specific surface area gamma-alumina. Other examples include the teachings described in U.S. Pat. Nos. 9,181,143 and 4,396,789, which are herein incorporated by reference in their entirety.

Bio-based vinyl acetate, on the other hand, may also be used in one of more embodiments of the present disclosure. Bio-based vinyl acetate may be produced by producing acetic acid by oxidation of ethanol (which may be formed as described above) followed by reaction of ethylene and acetic acid to acyloxylate the ethylene and arrive at vinyl acetate. Further, it is understood that the ethylene reacted with the acetic acid may also be formed from a renewable source as described above.

An exemplary route of obtaining a bio-based vinyl acetate may include, initially, the fermentation and optional purification of a renewable starting material, including those described above, to produce at least one alcohol (either ethanol or a mixture of alcohols including ethanol). The alcohol may be separated into two parts, where the first part is introduced into a first reactor and the second part may be introduced into a second reactor. In the first reactor, the alcohol may be dehydrated in order to produce an alkene (ethylene or a mixture of alkenes including ethylene, depending on whether a purification followed the fermentation) followed by optional purification to obtain ethylene. One of ordinary skill in the art may appreciate that if the purification occurs prior to dehydration, then it need not occur after dehydration, and vice versa. In the second reactor, the alcohol may be oxidized in order to obtain acetic acid, which may optionally be purified. In a third reactor, the ethylene produced in the first reactor and the acetic acid produced in the second reactor may be combined and reacted to acyloxylate the ethylene and form vinyl acetate, which may be subsequently isolated and optionally purified. Additional details about oxidation of ethanol to form acetic acid may be found in U.S. Pat. No. 5,840,971 and Selective catalytic oxidation of ethanol to acetic acid on dispersed Mo—V—Nb mixed oxides. Li X, Iglesia E. Chemistry. 2007; 13(33):9324-30.

However, the present disclosure is not so limited in terms of the route of forming acetic acid. Rather, it is also envisioned, that acetic acid may be obtained from a fatty acid, as described in "The Production of Vinyl Acetate Monomer as a Co-Product from the Non-Catalytic Cracking of Soybean Oil", Benjamin Jones, Michael Linnen, Brian Tande and Wayne Seames, Processes, 2015, 3, 61-9-633. Further, the production of acetic acid from fermentation performed by acetogenic bacteria, as described in "Acetic acid bacteria: A group of bacteria with versatile biotechnological applications", Saichana N, Matsushita K, Adachi O, Frébort I, Frebortova J. Biotechnol Adv. 2015 Nov. 1; 33(6 Pt 2):1260-71 and Biotechnological applications of acetic acid bacteria. Raspor P, Goranovic D. Crit Rev Biotechnol. 2008; 28(2):101-24. Further, it is also understood that the production of ethylene used to produce vinyl acetate may also be used to provide the ethylene that is subsequently reacted with the vinyl acetate to form the EVA copolymer of the present disclosure. Thus, for example, the amount of ethanol that is fed to the first and second reactors, respectively, may be vary depending on the relative amounts of ethylene and vinyl acetate being polymerized.

Plasticizers

Polymer compositions containing EVA may have their softness enhanced through the addition of plasticizers.

In one or more embodiments, polymer compositions in accordance with the present disclosure may incorporate one or more plasticizers to adjust the physical properties and processability of the composition. In some embodiments, plasticizers in accordance with the present disclosure may include one or more of bis(2-ethylhexyl) phthalate (DEHP), di-isononyl phthalate (DINP), bis (n-butyl) phthalate (DNBP), butyl benzyl phthalate (BZP), di-isodecyl phthalate (DIDP), di-n-octyl phthalate (DOP or DNOP), di-o-octyl phthalate (DIOP), diethyl phthalate (DEP), di-isobutyl phthalate (DIBP), di-n-hexyl phthalate, tri-methyl trimellitate (TMTM), tri-(2-ethylhexyl) trimellitate (TEHTM-MG), tri-(n-octyl, n-decyl) trimellitate, tri-(heptyl, nonyl) trimellitate, n-octyl trimellitate, bis (2-ethylhexyl) adipate (DEHA), dimethyl adipate (DMD), mono-methyl adipate (MMAD), dioctyl adipate (DOA)), dibutyl sebacate (DBS), polyesters of adipic acid such as VIERNOL, dibutyl maleate (DBM), di-isobutyl maleate (DIBM), benzoates, epoxidized soybean oils, n-ethyl toluene sulfonamide, n-(2-hydroxypropyl) benzene sulfonamide, n-(n-butyl) benzene sulfonamide, tricresyl phosphate (TCP), tributyl phosphate (TBP), glycols/polyesters, triethylene glycol dihexanoate, 3gh), tetraethylene glycol di-heptanoate, polybutene, acetylated monoglycerides; alkyl citrates, triethyl citrate (TEC), acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trihexyl o-butyryl citrate, trimethyl citrate, alkyl sulfonic acid phenyl ester, 2-cyclohexane dicarboxylic acid di-isononyl ester, nitroglycerin, butanetriol trinitrate, dinitrotoluene, trimethylolethane trinitrate, diethylene glycol dinitrate, triethylene glycol dinitrate, bis (2,2-dinitropropyl) formal, bis (2,2-dinitropropyl) acetal, 2,2,2-trinitroethyl 2-nitroxyethyl ether, mineral oils, among other plasticizers and polymeric plasticizers. In particular embodiments, one of the one or more plasticizers may be mineral oil.

Blowing Accelerators

Polymer compositions in accordance with the present disclosure may include one or more blowing accelerators (also known as kickers) that enhance or initiate the action of a blowing agent by lower the associated activation temperature. For example, blowing accelerators may be used if the selected blowing agent reacts or decomposes at temperatures higher than 170° C., such as 220° C. or more, where the surrounding polymer would be degraded if heated to the activation temperature. Blowing accelerators may include any suitable blowing accelerator capable of activating the selected blowing agent. In one or more embodiments, suitable blowing accelerators may include cadmium salts, cadmium-zinc salts, lead salts, lead-zinc salts, barium salts, barium-zinc (Ba—Zn) salts, zinc oxide, titanium dioxide, triethanolamine, diphenylamine, sulfonated aromatic acids and their salts, and the like. Polymer compositions in accordance with particular embodiments of the present disclosure may include zinc oxide as one of the one or more blowing accelerators. In some embodiments, blowing accelerators may be included in the elastomeric EVA compositions in addition to, or instead of, the polymer composition itself.

Blowing Agents

Polymer compositions in accordance with the present disclosure may include one or more blowing agents to produce expanded polymer compositions and foams. Blowing agents may include solid, liquid, or gaseous blowing agents. In embodiments utilizing solid blowing agents, blowing agents may be combined with a polymer composition as a powder or granulate. In some embodiments, blowing agents may be included in the elastomeric EVA compositions in addition to, or instead of, the polymer composition itself.

Blowing agents in accordance with the present disclosure may include chemical blowing agents that decompose at polymer processing temperatures, releasing the blowing gases such as $N_2$, CO, $CO_2$, and the like. Examples of chemical blowing agents may include organic blowing agents, including hydrazines such as toluenesulfonyl hydrazine, hydrazides such as oxydibenzenesulfonyl hydrazide, diphenyl oxide-4,4'-disulfonic acid hydrazide, and the like, nitrates, azo compounds such as azodicarbonamide, cyanovaleric acid, azobis(isobutyronitrile), and N-nitroso compounds and other nitrogen-based materials, and other compounds known in the art.

Inorganic chemical blowing agents may include carbonates such as sodium hydrogen carbonate (sodium bicarbonate), sodium carbonate, potassium bicarbonate, potassium carbonate, ammonium carbonate, and the like, which may be used alone or combined with weak organic acids such as citric acid, lactic acid, or acetic acid.

Crosslinking Agent

Polymer compositions in accordance with the present disclosure may include one or more crosslinking agents capable of generating free radicals during polymer processing. In one or more embodiments, crosslinking agents may include peroxide agents. In one or more embodiments, peroxide agents may include bifunctional peroxides such as benzoyl peroxide; dicumyl peroxide; di-tert-butyl peroxide; 00-Tert-amyl-0-2-ethylhexyl monoperoxycarbonate; tert-butyl cumyl peroxide; tert-butyl 3,5,5-trimethylhexanoate peroxide; tert-butyl peroxybenzoate; 2-ethylhexyl carbonate tert-butyl peroxide; 2,5-dimethyl-2,5-di (tert-butylperoxide) hexane; 1,1-di(tert-butylperoxide)-3,3,5-trimethylcyclohexane; 2,5-dimethyl-2,5-di(tert-butylperoxide) hexyne-3; 3,3,5,7,7-pentamethyl-1,2,4-trioxepane; butyl 4,4-di (tert-butylperoxide) valerate; di (2,4-dichlorobenzoyl) peroxide; di(4-methylbenzoyl) peroxide; peroxide di(tert-butylperoxyisopropyl) benzene; and the like. In some embodiments, peroxide agents may be included in the elastomeric EVA compositions in addition to, or instead of, the polymer composition itself.

Crosslinking agents may also include benzoyl peroxide, 2,5-di(cumylperoxy)-2,5-dimethyl hexane, 2,5-di(cumylperoxy)-2,5-dimethyl hexyne-3,4-methyl-4-(t-butylperoxy)-2-pentanol, butyl-peroxy-2-ethyl-hexanoate, tert-butyl peroxypivalate, tertiary butyl peroxyneodecanoate, t-butyl-peroxy-benzoate, t-butyl-peroxy-2-ethyl-hexanoate, 4-methyl-4-(t-amylperoxy)-2-pentanol, 4-methyl-4-(cumylperoxy)-2-pentanol, 4-methyl-4-(t-butylperoxy)-2-pentanone, 4-methyl-4-(t-amylperoxy)-2-pentanone, 4-methyl-4-(cumylperoxy)-2-pentanone, 2,5-dimethyl-2,5-di(t-butylperoxy)hexane, 2,5-dimethyl-2,5-di(t-amylperoxy) hexane, 2,5-dimethyl-2,5-di(t-butylperoxy)hexyne-3,2,5-dimethyl-2,5-di(t-amylperoxy)hexyne-3,2,5-dimethyl-2-t-butylperoxy-5-hydroperoxyhexane, 2,5-dimethyl-2-cumylperoxy-5-hydroperoxy hexane, 2,5-dimethyl-2-t-amylperoxy-5-hydroperoxyhexane, m/p-alpha, alpha-di[(t-butylperoxy)isopropyl]benzene, 1,3,5-tris(t-butylperoxyisopropyl)benzene, 1,3,5-tris(t-amylperoxyisopropyl)benzene, 1,3,5-tris (cumylperoxyisopropyl)benzene, di[1,3-dimethyl-3-(t-butylperoxy)butyl]carbonate, di[1,3-dimethyl-3-(t-amylperoxy)butyl]carbonate, di[1,3-dimethyl-3-(cumylperoxy)butyl]carbonate, di-t-amyl peroxide, t-amyl cumyl peroxide, t-butyl-isopropenylcumyl peroxide, 2,4,6-tri(butylperoxy)-s-triazine, 1,3,5-tri[1-(t-butylperoxy)-1-methylethyl]benzene, 1,3,5-tri-[(t-butylperoxy)-isopropyl] benzene, 1,3-dimethyl-3-(t-butylperoxy)butanol, 1,3-dimethyl-3-(t-amylperoxy)butanol, di(2-phenoxyethyl) peroxydicarbonate, di(4-t-butylcyclohexyl) peroxydicarbonate, dimyristyl peroxydicarbonate, dibenzyl peroxydicarbonate, di(isobomyl)peroxydicarbonate, 3-cumylperoxy-1,3-dimethylbutyl methacrylate, 3-t-butylperoxy-1,3-dimethylbutyl methacrylate, 3-t-amylperoxy-1,3-dimethylbutyl methacrylate, tri(1,3-dimethyl-3-t-butylperoxy butyloxy)vinyl silane, 1,3-dimethyl-3-(t-butylperoxy)butyl N-[1-{3-(1-methylethenyl)-phenyl}-1-methylethyl]carbamate, 1,3-dimethyl-3-(t-amylperoxy)butyl N-[1-{3(1-methylethenyl)-phenyl}-1-methylethyl]carbamate, 1,3-dimethyl-3-(cumylperoxy))butyl N-[1-{3-(1-methylethenyl)-phenyl}-1-methylethyl]carbamate, 1,3-di(t-butylperoxy)-3,3,5-trimethylcyclohexane, 1,1-di(t-butylperoxy)cyclohexane, n-butyl 4,4-di(t-amylperoxy)valerate, ethyl 3,3-di(t-butylperoxy)butyrate, 2,2-di(t-amylperoxy)propane, 3,6,6,9,9-pentamethyl-3-ethoxycabonylmethyl-1,2,4,5-tetraoxacyclononane, n-buty 1-4,4-bis(t-butylperoxy)valerate, ethyl-3,3-di(t-amylperoxy)butyrate, benzoyl peroxide, OO-t-butyl-O-hydrogen-monoperoxy-succinate, OO-t-amyl-O-hydrogen-monoperoxy-succinate, 3,6,9, triethyl-3,6,9-trimethyl-1,4,7-triperoxynonane (or methyl ethyl ketone peroxide cyclic trimer), methyl ethyl ketone peroxide cyclic dimer, 3,3,6,6,9,9-hexamethyl-1,2,4,5-tetraoxacyclononane, 2,5-dimethyl-2,5-di(benzoylperoxy)hexane, t-butyl perbenzoate, t-butylperoxy acetate, t-butylperoxy-2-ethyl hexanoate, t-amyl perbenzoate, t-amyl peroxy acetate, t-butyl peroxy isobutyrate, 3-hydroxy-1,1-dimethyl t-butyl peroxy-2-ethyl hexanoate, OO-t-amyl-O-hydrogen-monoperoxy succinate, OO-t-butyl-O-hydrogen-monoperoxy succinate, di-t-butyl diperoxyphthalate, t-butylperoxy (3,3,5-trimethylhexanoate), 1,4-bis(t-butylperoxycarbo)cyclohexane, t-butylperoxy-3,5,5-trimethylhexanoate, t-butyl-peroxy-(cis-3-carboxy)propionate, allyl 3-methyl-3-t-butylperoxy butyrate, OO-t-butyl-O-isopropylmonoperoxy carbonate, OO-t-butyl-O-(2-ethyl hexyl)monoperoxy carbonate, 1,1,1-tris[2-(t-butylperoxy-carbonyloxy)ethoxymethyl]propane, 1,1,1-tris[2-(t-amylperoxy-carbonyloxy)ethoxymethyl]propane, 1,1,1-tris[2-(cumylperoxy-cabonyloxy)ethoxymethyl]propane, OO-t-amyl-O-isopropylmonoperoxy carbonate, di(4-methylbenzoyl)peroxide, di(3-methylbenzoyl)peroxide, di(2-methylbenzoyl)peroxide, didecanoyl peroxide, dilauroyl peroxide, 2,4-dibromo-benzoyl peroxide, succinic acid peroxide, dibenzoyl peroxide, di(2,4-dichloro-benzoyl)peroxide, and combinations thereof.

Crosslinking Co-Agents

It is also envisioned that crosslinking co-agent may be combined in the polymer composition. Crosslinking co-agents create additional reactive sites for crosslinking, allowing the degree of polymer crosslinking to be considerably increased from that normally obtained solely by the addition of peroxide. Generally, co-agents increase the rate of crosslinking. In one or more embodiments, the crosslinking co-agents may include Triallyl isocyanurate (TAIL), trimethylolpropane-tris-methacrylate (TRIM), triallyl cyanurate (TAC) and combinations thereof.

Fillers and Additives

Polymer compositions in accordance with the present disclosure may include fillers and additives that modify various physical and chemical properties when added to the polymer composition during blending that include one or more polymer additives such as processing aids, lubricants, antistatic agents, clarifying agents, nucleating agents, beta-nucleating agents, slipping agents, antioxidants, compatibilizers, antacids, light stabilizers such as HALS, IR absorbers, whitening agents, inorganic fillers, organic and/or inorganic dyes, anti-blocking agents, processing aids, flame-retardants, plasticizers, biocides, adhesion-promoting agents, metal oxides, mineral fillers, glidants, oils, anti-oxidants, antiozonants, accelerators, and vulcanizing agents. In some embodiments, fillers and/or additives may be included in the elastomeric EVA compositions in addition to, or instead of, the polymer composition itself.

Polymer compositions in accordance with the present disclosure may include one or more inorganic fillers such as talc, glass fibers, marble dust, cement dust, clay, carbon black, feldspar, silica or glass, fumed silica, silicates, calcium silicate, silicic acid powder, glass microspheres, mica, metal oxide particles and nanoparticles such as magnesium oxide, antimony oxide, zinc oxide, inorganic salt particles and nanoparticles such as barium sulfate, wollastonite, alumina, aluminum silicate, titanium oxides, calcium carbonate, polyhedral oligomeric silsesquioxane (POSS), or recycled EVA. As defined herein, recycled EVA may be derived from regrind materials that have undergone at least one processing method such as molding or extrusion and the subsequent sprue, runners, flash, rejected parts, and the like, are ground or chopped.

Properties of Polymer Compositions

Polymer compositions in accordance with one or more embodiments of the present disclosure may exhibit a bio-based carbon content, as determined by ASTM D6866-18 Method B, of at least 5%. In some embodiments, polymer compositions may contain at least 10%, 20%, 40%, 50%, 60%, 70%, 80%, 90%, or 99% bio-based carbon.

In one or more embodiments, polymer compositions in accordance with the present disclosure may be expanded and cured. Expanded polymer compositions in accordance with one or more embodiments of the present disclosure may have a density, in accordance ASTM D-792, ranging from a lower limit selected from any one of 0.01, 0.015, 0.02, 0.025, 0.03, or 0.035 g/cm$^3$ to an upper limit selected from one of 0.04, 0.045, 0.05, 0.055, 0.06, 0.07, or 0.08 g/cm$^3$, where any lower limit may be paired with any upper limit. Expanded polymer compositions in accordance with one or more embodiments of the present disclosure may have an expansion ratio 80% or more, 100% or more, 120% or more, 150% or more, 200% or more, 250% or more, or 300% or more.

Expanded polymer compositions in accordance with one or more embodiments of the present disclosure may have a Shore 00 hardness as determined by ASTM D2240 that ranges from a lower limit of any of 10, 15, 20, 25 30, or 40 to an upper limit of 50, 55, 60, 65, 70, or 80 Shore 00, where any lower limit can be paired with any upper limit.

Expanded polymer compositions in accordance with the present disclosure may have a rebound, as determined by ASTM D3574, that range from a lower limit selected from one of 20%, 30%, 35%, 40%, 45%, 50%, and 55% to an upper limit selected from one of 60%, 65%, 70%, 75%, 80%, 85% and 90%, where any lower limit may be paired with any upper limit. In particular embodiments, expanded polymer compositions may exhibit a rebound, as determined in accordance with ASTM D3574, that ranges from 30% to 85%.

Methods

Polymer compositions in accordance with the present disclosure may be prepared in any conventional mixture device or means. In one or more embodiments, polymeric compositions may be prepared by mixture in conventional kneaders, banbury mixers, mixing rollers, twin screw extruders, presses and the like, in conventional EVA processing conditions and subsequently cured or cured and expanded in conventional expansion processes, such as injection molding or compression molding.

In one or more embodiments, polymer compositions in accordance with the present disclosure may include EVA polymers that are prepared in reactor by the polymerization of ethylene and vinyl acetate. In some embodiments, the ethylene and vinyl acetate are polymerized by high pressure radical polymerization, wherein peroxide agents act as polymerization initiators. In some embodiments, the ethylene, vinyl acetate, and peroxide agents are added at elevated pressure into an autoclave or tubular reactor at a temperature of between 80° C. and 300° C. and a pressure inside the reactor between 500 bar and 3000 bar in some embodiments, and a pressure between 1000 bar and 2600 bar in more specific embodiments. In other embodiments, the polymers may be produced by a solution polymerization process.

As mentioned, one or more free-radical producing agents, including any of those described above may be present during the polymerization. Further, it is also understood that upon being mixed with the other components forming the polymer composition, the polymer composition may also be cured by, for example, in the presence of peroxides, including those discussed above, and optionally, a crosslinking co-agent, also discussed above. For embodiments which include expanded compositions, the expanding and curing may be in the presence of a blowing agent and a peroxide agent, and optionally, a blowing accelerator or crosslinking co-agent. During any of such curing steps, in one or more embodiments, the curing may occur in full or partial presence of oxygen, such as described in WO201694161A1, which is incorporated by reference in its entirety.

The polymer composition may be extruded with an extruder that may provide for the injection of a gas, or when a chemical blowing agent is used, the blowing agent may be mixed with the polymer being fed into the extruder. Gas, either injected into the extruder or formed through thermal decomposition of a chemical blowing agent in the melting zone of the extruder. The gas (irrespective of the source of the gas) in the polymer forms into bubbles that distribute through the molten polymer. Upon eventual solidification of the molten polymer, the gas bubble results in a cell structure or foamed material. In particular embodiments, the cell structure of the expanded composition may be a closed cell structure. Polymer compositions in accordance with the present disclosure may be expanded to form a foam in a double-expansion foaming process, and reaching the above described properties in such double-expansion foaming process. A double-expansion process is similar to a single-expansion process, with the difference that the polymer composition is expanded two times instead of one time. A first expansion step may take place in a press or similar equipment to an expansion ratio of up to 70%, or up to 60%, or up to 50%, or up to 40%. This first expansion step may be conducted at a lower temperature than the expansion in the second expansion step. A lower temperature is utilized in the first expansion step to obtain a partially crosslinked and expanded foam. In the second expansion step, the expanded product from the first expansion step will be further expanded to a higher expansion ratio of 80% or more, 100% or more, 120% or more, 150% or more, 200% or more, 250% or more, or 300% or more. The temperature in the second expansion step may range from a lower limit selected from 160° C., 165° C. or 170° C. to an upper limit selected from 175° C., 180° C. or 185° C., where any lower limit may be paired with any upper limit. However, embodiments also relate to use of a single-expansion foaming process. In accordance with the present expansion process, the compositions may have an expansion ratio of 80% or more, 100% or more, 120% or more, 150% or more, 200% or more, 250% or more, or 300% or more.

In one or more embodiments, components of the elastomeric EVA composition may be combined at a temperature in the range of 70° C. and 190° C. and for a time in the range of 1 to 25 minutes, prior to combination with the other components to produce a polymer composition in accordance with the present disclosure. For example, the components of the elastomeric EVA may be combined and processed into a polymer resin prior to a second step of combining with a base polymer, filler, and/or peroxide agent.

Articles

Expanded polymer compositions in accordance with one or more embodiments of the present disclosure may be used for the production of a number of polymer articles used for a diverse array of end-uses, but especially those where softness is desired. Such applications may include bras, bedding, mattresses, pillows, upholstery, automotive seats, garments, shoes, foams, furniture, electro-electronic, automotive, packaging, mats, paperboards, sportive articles, toys, swimming accessories, educational games and articles, decorative panels, EVA balls, slippers, sponges, seats, cycling bib pads, protective covers, carpets, aprons and others.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A polymer composition, comprising:
- an ethylene vinyl acetate polymer;
- a blowing agent in an amount ranging from 2 to 13 phr; and
- a crosslinking agent in an amount ranging from 0.3 to 4 phr,
- wherein the polymer composition has a Shore A hardness as determined by ASTM D2240 in a range of 40 to 90, and
- wherein the polymer composition exhibits, when foamed:
  - a rebound as determined by ASTM D3574 in a range of 30% to 85%,
  - a hardness as determined by ASTM D2240 in a range of 15 to 40 Shore OO,
  - a density as determined by ASTM D-792 in a range of 0.01 g/cm$^3$ to 0.06 g/cm$^3$, and an expansion ratio of 80% or more.

2. The polymer composition according to claim 1, wherein the blowing agent is present in an amount ranging from 2 to 12 phr.

3. The polymer composition according to claim 1, wherein the blowing agent is present in an amount ranging from 2 to 11 phr.

4. The polymer composition according to claim 1, wherein the blowing agent is present in an amount ranging from 2 to 10 phr.

5. The polymer composition according to claim 1, wherein the blowing agent is present in an amount ranging from 2 to 9 phr.

6. The polymer composition according to claim 1, wherein the expansion ratio is 100% or more.

7. The polymer composition according to claim 1, wherein the expansion ratio is 120% or more.

8. The polymer composition according to claim 1, wherein the expansion ratio is 150% or more.

9. The polymer composition according to claim 1, wherein the expansion ratio is 200% or more.

10. The polymer composition according to claim 1, wherein the expansion ratio is 250% or more.

11. The polymer composition according to claim 1, wherein the expansion ratio is 300% or more.

12. The polymer composition of claim 1, wherein the ethylene vinyl acetate (EVA) polymer comprises:
- a first EVA polymer at an amount ranging from 40 to 90 phr; and
- a second EVA polymer at an amount ranging from 10 to 50 phr.

13. The polymer composition of claim 12, wherein the ethylene vinyl acetate (EVA) polymer comprises a vinyl acetate content ranging from 12 wt % and 33 wt %, based on the EVA polymer.

14. The polymer composition of claim 12, wherein the ethylene vinyl acetate (EVA) polymer has a melt flow rate, measured according to ASTM D1238 at 190° C./2.16 kg, ranging from 1 to 50 g/10 min.

15. A method, comprising:

expanding the polymer composition of claim 1, to form a foam expanded by at least 80%.

* * * * *